UNITED STATES PATENT OFFICE.

JOSEPH VAN RUYMBEKE, OF CHICAGO, ILLINOIS, ASSIGNOR OF ONE-HALF TO WILLIAM F. JOBBINS, OF SAME PLACE.

PROCESS OF OBTAINING AMMONIA AND ILLUMINATING GAS FROM TANK-WATERS.

SPECIFICATION forming part of Letters Patent No. 351,412, dated October 26, 1886.

Application filed July 27, 1885. Serial No. 172,842. (No specimens.)

*To all whom it may concern:*

Be it known that I, JOSEPH VAN RUYMBEKE, a citizen of Belgium, residing at Chicago, in the county of Cook and State of Illinois, have invented certain new and useful Improvements in Processes for Producing and Collecting Ammoniated and Ignitible Gases from Waste-Tank Waters of Slaughter and Rendering Houses, which are fully set forth in the following specification.

In the production of gases by the distillation of concentrated tank-waters so high a degree of heat has been heretofore applied that the operation has been destructive both to the quality and quantity of the product. This I remedy by the application of heat within certain prescribed and well-defined limits, by which means I am enabled greatly to improve the quality of the product and avoid the loss which has heretofore made the operation unprofitable.

In carrying out my process the tank-water is obtained, preferably, sweet, which can be accomplished by passing the liquids while in a heated condition from the rendering-tank to the evaporator, which also avoids the production of free ammonia. If the waters have been allowed to cool and decomposition has commenced, the ammonia generated passes over with the steam of evaporation, and is collected by its passage through a sulphuric-acid bath. The evaporation of the tank-water is effected by subjecting it to a steam heat ranging from 150° to 300° Fahrenheit until it is reduced to about thirty per cent. of moisture, when this product is passed into a suitable apparatus and distilled under a heat of 350° to 500° Fahrenheit, the operation being continued one hour for each inch of thickness of the material operated upon.

The albuminoids, which constitute the concentrated product of tank-waters and other similar liquids, are by the application of these degrees of heat resolved into hydrocarbons, oxides of carbon, carbonic acid, and nitrogenous compounds. When these compounds are submitted to the degree of heat heretofore employed in destructive distillation, the hydrocarbons and nitrogenous gases produced undergo a secondary decomposition, whereby they are decomposed into less carbureted hydrocarbons and compounds which are no longer volatile. The nitrogen evolved by such high degree of heat is in large proportion released in the form of free nitrogen, which, not being combustible, dilutes and detracts from the value and efficiency of the illuminating-gas as such and cannot be separated therefrom or be transformed into ammoniacal compounds.

In the discovery and production of my insecticide fertilizer from concentrated tank liquids, as per application for a United States patent, Serial No. 170,808, filed July 6, 1885, I was led to the application of such specific degrees of heat as produced reliquefaction of the product of evaporation, such degrees of heat varying according to the thickness in inches of the material operated upon and the time during which the heat was applied, the most satisfactory degrees of which ranged between 450° and 500°. By thus limiting the application of heat to a degree not exceeding 500° Fahrenheit within the limits of and during the period of reliquefying decomposition I avoid all destructive distillation, simply decomposing the original albuminoids into less complicated molecular structures, some of which are volatile and form the basis of this application. The volatile products thus produced are composed of water, highly-carbureted hydrocarbons, and nitrogenous compounds. The temperature of decomposition being limited to the period of reliquefaction, the hydrocarbons thus generated will escape without loss from the distillation-chamber to the condensers, thus avoiding further decomposition, but retaining high illuminating properties, owing to their strongly-carbureted condition. The nitrogenous compounds thus volatilized do not contain free nitrogen, but consist of ammonia, ammonia compounds, amines, and amides, which pass from the distillation-chamber, together with the hydrocarbons, to a refrigerating and sulphuric-acid condenser, where the nitrogenous gases are condensed, and produce ammoniacal waters and ammonium sulphide, while the hydrocarbons pass on to the collecting-reservoir unchanged, but purified from the nitrogenous gases.

What I claim as my invention is—

The process of treating concentrated tank-waters by applying to them a degree of heat not exceeding about 500° Fahrenheit, and collecting the volatile products, whereby highly-illuminating and ammoniacal gases are obtained and the decomposition of valuable substances is avoided.

JOSEPH VAN RUYMBEKE.

Witnesses:
WM. ZIMMERMAN,
WILLIAM F. JOBBINS.